United States Patent
Daferner et al.

(10) Patent No.: US 7,212,877 B2
(45) Date of Patent: May 1, 2007

(54) METHOD FOR CONTROLLING A PRODUCTION SEQUENCE

(75) Inventors: Martin Daferner, Sindelfingen (DE); Reiner Supper, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/552,975

(22) PCT Filed: Feb. 19, 2004

(86) PCT No.: PCT/EP2004/001564

§ 371 (c)(1),
(2), (4) Date: Jun. 8, 2006

(87) PCT Pub. No.: WO2004/090651

PCT Pub. Date: Oct. 21, 2004

(65) Prior Publication Data

US 2006/0259174 A1    Nov. 16, 2006

(30) Foreign Application Priority Data

Apr. 9, 2003    (DE) ................................. 103 16 103

(51) Int. Cl.
*G06F 19/00* (2006.01)
(52) U.S. Cl. ........................................ 700/100; 700/101
(58) Field of Classification Search ................ 700/100, 700/101, 103, 108; 705/7
See application file for complete search history.

(56) References Cited

U.S. PATENT DOCUMENTS

| | | | |
|---|---|---|---|
| 6,141,598 A | 10/2000 | Nam | 700/95 |
| 6,546,301 B1 * | 4/2003 | Walkowiak et al. | 700/100 |
| 6,748,286 B1 | 6/2004 | Lösch | 700/97 |
| 7,039,484 B2 * | 5/2006 | Daferner | 700/108 |

FOREIGN PATENT DOCUMENTS

| | | |
|---|---|---|
| DE | 198 15 619 | 10/1999 |
| DE | 298 13 589 U1 | 1/2000 |
| DE | 199 02 056 C1 | 10/2000 |

(Continued)

OTHER PUBLICATIONS

U.S. Appl. No. 10/532,890, filed Apr. 27, 2005, Daferner.

*Primary Examiner*—Leo Picard
*Assistant Examiner*—Steven R. Garland
(74) *Attorney, Agent, or Firm*—Davidson, Davidson & Kappel, LLC

(57) ABSTRACT

A method for controlling a production process for the manufacture of customized production objects. A sequence of production objects runs through at least one partial process of a production process. The method ensures that, in series production, the processing of an order in the partial process is begun at the latest after a maximum waiting time. The sequence of electronically available orders is handled separately from the sequence of production objects and a copy of the order sequence is generated. If the first order of the copy does not match the first production object, the order is stored in an electronic buffer memory and a matching order for the first production object is determined. The order with the greatest waiting time is removed from this buffer memory whenever the previous waiting time exceeds a prescribed waiting time limit. A production object matching this order is brought forward and processed according to the order.

24 Claims, 6 Drawing Sheets

| | FOREIGN PATENT DOCUMENTS | | | EP | 0 600 146 B1 | 6/1994 |
|----|---|---|---|----|---|---|
| | | | | EP | 0 721 625 B1 | 7/1996 |
| DE | 199 27 563 | | 12/2000 | WO | WO 00/68750 | 11/2000 |
| DE | 693 31 132 T2 | | 3/2002 | | | |
| DE | 694 30 484 T2 | | 11/2002 | | | |
| DE | 102 50 285 | | 5/2004 | * cited by examiner | | |

METHOD FOR CONTROLLING A PRODUCTION SEQUENCE

The invention relates to a method for automatically controlling a production process for the manufacture of customized production objects.

A method for automatically controlling a production process for the series production of order-specific products is known from DE 19927563 A1. A separation of the sequence of the production objects and the sequence of the orders is disclosed. A production object, referred to there as a product, is temporarily assigned an order for a partial process, referred to there as a production step. In this way, a production object and an order are selected. A work order for the partial process to process the selected production object is generated for the selected order and is executed when the production object runs through the partial process. Once the production object has run through the partial process, it is assigned the same order or another order.

The method according to DE 19927563 A1 is unable to ensure that the processing of an order in a partial process is begun at the latest after a maximum waiting time. This is so because it is possible that a specific order is not assigned to a production object for any length of time and is therefore postponed for an unlimited time. In this case, the processing only begins at some later time or never.

DE 19815619 A1 discloses a method for controlling a production process, there a vehicle assembly process. The production process comprises a body line, a paint line and an equipment line, in which various items of equipment are assembled on the production objects—here: the painted vehicle bodies. A sequence plan for the equipment lines is generated, based on this a sequence plan for the paint lines, and based on this sequence plan a sequence plan for the body line is generated. Prescribed for these are specifications for vehicles. The method disclosed in DE 19815619 A1 is unable to avoid long waiting times for individual orders with certain specifications.

SUMMARY OF THE INVENTION

The invention is based on the object of providing a method for automatically controlling a production process for the series production of order-specific products where the production process comprises a partial process, a sequence of orders in electronic form for products which are produced in the production process, and a sequence of production objects from which the products are created run through the production process, a selection process in which an order of the order sequence and a production object of the production object sequence that match one another are selected, the selected production object is processed according to the selected order in the partial process and the selection process and processing are repeated until each order of the order sequence has run through the partial process, by which it is ensured in series production that the processing of an order in the partial process is begun at the latest after a maximum waiting time.

A sequence of production objects and a sequence of orders in electronic form for products which are produced in the production process from the production objects run through the production process. This production process comprises a partial process. This partial process is either part of the overall production process or the same as the entire production process. The method controls the sequence in which the production objects are introduced into this partial process for the purpose of processing them.

According to the invention, a copy of the order sequence is formed. An initially empty electronic buffer memory for orders is created. The orders which cannot be executed immediately by processing a production object are stored in this buffer memory.

A selection process, in which an order of the copy of the order sequence and a production object of the production object sequence that match one another are selected in each case, is repeatedly carried out. In this comparison, preferably features of an order are compared with such features of a production object that are created or changed in the subsequent partial process, and not with those that remain unchanged in the partial process. In a selection process, whenever the first production object of the production object sequence and the first order of the copy do not match one another, the first order is removed from the copy and stored in the buffer memory. Furthermore, in a selection process, whenever the previous waiting time of at least one order in the buffer memory is greater than or equal to a predetermined waiting time limit, the following steps are carried out:

The order with the greatest waiting time in the buffer memory and a production object matching it are selected from the production object sequence.

The selected order is removed from the buffer memory.

The selected production object is brought forward to the first place of the production object sequence.

A production facility in which the production process is realized preferably comprises means for bringing a production object forward to the first place of the production object sequence. These means comprise, for example, a sorting buffer with random access to the production objects stored in it or a device for moving a production object out of the production object sequence and moving this production object to the first place. An alternative embodiment comprises producing a stock of production objects and buffer-storing them, in order to have a production object that matches the order with the greatest waiting time available when bringing forward is not otherwise possible.

The method presupposes that a waiting time limit VS is prescribed. This waiting time limit VS is compared with the times that orders have been present in the electronic buffer memory.

It is explained below why the method guarantees an upper limit for the waiting time, that is to say why it is ensured that the waiting time never exceeds a certain upper limit.

In series production, a minimum time interval T_min and a maximum time interval T_max between two selection processes are prescribed. In the case of cyclical production, these two time intervals typically coincide and are equal to the cycle time. The method can also be applied, however, to series production without prescribed cyclical production.

Let M be the smallest natural number that is greater than or equal to the quotient of the waiting time limit VS and the minimum time interval T_min. Let $t_1, t_2, \ldots$ be the points in time of the selection processes.

At every point in time of the processing of the orders, a maximum of M orders are in the electronic buffer memory. This is because the electronic buffer memory is empty at the beginning of processing, and at most one order is stored in the buffer memory with each selection process. If, after a selection process, at the point in time $t_n$, precisely M orders are in the buffer memory, the order with the greatest waiting time has therefore already been in the buffer memory for the duration of at least M selection processes. Let KA_max be this order. The waiting time of KA_max is greater than or equal to the waiting time limit VS, because M is greater than or equal to the quotient of VS and T_min and at least a time period of T_min lies between two selection processes. According to the invention, therefore, in the following selection process, at the point in time $t_{n+1}$, the order KA_max is selected and removed from the buffer memory. After this following selection process, then only M−1 orders are in the buffer memory. If, after the next-but-one selection process, that is to say after the at the point in time $t_{n+1}$, there are again M orders in the buffer memory, the above procedure is repeated.

Each order stays in the electronic buffer memory for the duration of a maximum of M+1 selection processes. This is because, at every point in time, there are a maximum of M orders in the buffer memory. Therefore, an order that remains in the buffer memory for the duration of M selection processes without being selected is, after these M selection processes, the order with the greatest waiting time in the buffer memory. According to the invention, this order is therefore selected in the next selection process, that is to say the selection process at the point in time $t_{n+1}$.

The waiting time of each order is therefore restricted to M+1 selection processes. Because, at most, a time of T_max passes between two selection processes, the waiting time of each order is less than or equal to (M+1)*T_max. The guaranteed maximum waiting time therefore amounts to (M+1)*T_max. In the case of cyclical production with a temporally constant cycle T, then T_max=T_min=T, and the maximum waiting time is VS+T.

The production of the products is begun at the beginning of the production process in the sequence given by the original order sequence. However, the production objects generally do not reach the partial process in this sequence. This is so because, in particular as a result of finishing work on individual production objects, which may become necessary for example because of quality deficiencies, because of missing or defective order-specific supplied parts or due to parallel processing in a previous partial process, the sequence of the production objects in the production object sequence may deviate from the sequence of the orders in the original order sequence. The number of positions which a production object moves forward is known as promotion. The number of positions which it falls back is referred to as demotion. By the method according to the invention, the promotion and demotion of a production object in the production object sequence is restricted.

The processing of each production object is preferably begun on the basis of an order. Therefore, each production object matches at least one order of the original order sequence. As explained above, the copy of the order remains in the buffer memory at most for the duration of M+1 selection processes. Subsequently, the order and a matching production object are selected. Therefore, on entering the partial process, this selected production object is given a demotion of at most M−1—in addition to a possibly already existing demotion from previous partial processes of the production process.

On the other hand, at each point in time, there are a maximum of M orders in the buffer memory. Therefore, when it enters the partial process, a production object can move forward one position in the production object sequence at most M times before it is selected. Therefore, a random sorter for production objects at the entry of the partial process need only occupy M places. In this way, the method according to the invention allows determination of the maximum required size for physical buffer memories in which production objects are buffer-stored before their processing in the partial process.

The method according to the invention additionally ensures that, for an order, a matching production object has run through the partial process at the latest after a maximum run-through time under the following precondition: a maximum processing time by the partial process, applicable to all production objects of the production object sequence, is prescribed. The processing time of a production object is the time interval between selection of the production object and emergence of the production object from the partial process. Contained in the processing time are waiting times in the partial process after selection of the production object, but not for example the waiting time between leaving a previous partial process and selection of the production object.

The maximum processing time in the partial process can be ensured by technical and organizational means, in the case of the production of motor vehicles for example by adequate dimensioning of processing stations and buffer memories and also an adequate number of finishing stations.

As explained above, at most, a waiting time that is less than or equal to the sum of the waiting time limit and the maximum time interval between two successive selection processes passes before the processing of a production object. Then at the latest, the production object is selected. The selection is followed by the processing in the partial process. The time period required for this is less than or equal to the prescribed maximum processing time.

The maximum run-through time through the partial process guaranteed in the case of the embodiment just described is accordingly the sum of
the prescribed waiting time limit,
the maximum time interval between two successive selection processes
and the maximum processing time in the partial process.

In a development of the method, the possibility of a failure of the partial process, which temporarily stops completely or delays considerably the running-through of the production objects, is additionally taken into account. In order to guarantee that the time period is maintained even for such a failure, a maximum error handling time after such a failure is guaranteed. Once this maximum error handling time has elapsed, production objects are again processed in the partial process in such a way that the maximum run-through time described above is maintained. The maximum error handling time is added to the maximum run-through time, and the sum is the guaranteed total run-through time.

In a further refinement, a numerical limit may be prescribed. It is consequently prescribed how many orders at most there may be simultaneously in the electronic buffer memory. The refinement ensures that this prescribed numerical limit is maintained.

For example, motor vehicles are produced in a production process with a number of successive partial processes, including the partial processes of shell construction, painting and providing interior fittings. Each motor vehicle is produced individually for a specific order. The customer is promised a delivery date, from which a final date of acceptance of the motor vehicle produced on the basis of his order is derived. A planned processing time is known for each partial process. A production object then runs through a partial process in the planned processing time whenever it is selected without deferral and is processed in the partial process without delay. The sum of all the planned processing times produces the planned processing time in the entire production process. Furthermore, a maximum delay of the actual final date of acceptance is designated with respect to the derived final date of acceptance. This maximum delay is divided between maximum permissible delays in the partial processes. The maximum run-through time for a partial process of the production process is obtained as a sum of the maximum permissible delay and the planned processing time of the partial process.

If the method according to the invention is applied to each partial process of the production process and maximum processing times are prescribed, each partial process maintains its maximum run-through time, and the maximum delay is the sum of all the guaranteed time periods.

In the customized production of motor vehicles, it is also often necessary for a number of individual subsystems to be produced. For this, each supplier is prescribed a supply order sequence, which is derived from the order sequence. A further advantage in the derivation of the supply order sequence is achieved by the method according to the invention. This advantage is explained for the case where the production process comprises two partial processes which are run through one after the other. A supply order sequence is generated from the order sequence for a supplier whose subsystems are fitted into the production objects during the second partial process.

With the aid of the method according to the invention, a maximum run-through time is guaranteed for the temporally first partial process. The supply order sequence is derived from the original order sequence. Even if orders have to be deferred when running through the first partial process, the original order sequence is not changed and the guaranteed maximum run-through time is nevertheless maintained. A subsystem which is produced and delivered according to the supply order sequence is fitted into a matching production object at the latest after elapse of the maximum run-through time through the first partial process and need not under any circumstances be buffer-stored for longer. The longer this buffer storage lasts, the more expensive it becomes, for example because of required depositing or storage space or disruptions in the planned sequence.

In addition, a longer lead time for the supplier is achieved by the method. As soon as the original order sequence is designated, the supply order sequence can be generated and determined to the supplier—even if the original order sequence has not yet reached the first partial process. The supply order sequence is not changed by delays or disruptions in the first partial process. The supplier therefore obtains a longer lead time, and consequently more time to set his production to the supply order sequence or to instruct his own subcontracted suppliers.

A maximum run-through time for the partial process can be derived from the prescribed waiting time limit of the method according to the invention. Conversely, a maximum run-through time that is required by the partial process is often prescribed. For example, the customer is promised a delivery date. A maximum total run-through time through the entire production process is derived from the time interval between placement of the order and the delivery date, and this is divided between maximum run-through times through the individual partial processes. Furthermore, the maximum time interval between two successive selection processes is prescribed, for example as the cycle time of series production. In the case of this embodiment, the waiting time limit of the method is determined such that the required maximum run-through time resulting from the designatation as described above is maintained.

A further refinement designates an alternative method, to select one order from among the orders stored in the buffer memory. For this purpose, it is automatically tested how long the processing of each order in the partial process lasts, presupposing that this order and a matching production object are selected. In this case, a matching production object is determined on a trial basis for each order in the buffer memory. On a trial basis, a work order for the partial process is generated for the processing of the matching production object for the order. It is determined how long the implementation of this work order will last with respect to the matching production object. For this determination, a simulation is carried out for example, or operating protocols with execution times of jobs performed in the partial process are evaluated. That order in the buffer memory for which the sum of the waiting time in the buffer memory and the implementation time determined on a trial basis takes the greatest value is selected. This ensures that the run-through time through the partial process is as small as possible on average over the deferred orders.

Another further refinement takes into account the possibility that an order remains in the electronic buffer memory until the waiting time limit is reached. In this case, this order is removed from the buffer memory and marked. For example, it is identified as not able to be constructed within a prescribed time period or is transferred to the beginning of the production process or the partial process.

The invention provides that an order in the buffer memory and a matching production object are selected whenever the waiting time of an order in the buffer memory is greater than or equal to the waiting time limit. Another further refinement provides that, under certain circumstances, an order in the buffer memory is selected even if no waiting time of an order reaches this limit, to be specific whenever the first production object of the production object sequence matches an order in the buffer memory.

In yet a further refinement, the occasional requirement that production objects are processed in the partial process in batches is taken into account. For example, the batch size is N=4, and, in a paint line as the partial process, four production objects are painted in the same color one after the other as a batch. In this way, the paint line can be operated much more efficiently than if, each time after painting a production object, the paint line had to be cleaned and prepared for painting in a different color. In this example, the painting of the production objects does not depend on such features of the production objects that are manufactured in previous partial processes.

In another refinement, an optimum set, with respect to an assessment function, of N orders and N production objects is selected. For this, various possible selections, that is to say various sets, are compared, in that they are selected on a trial basis, the assessment function is applied to each of these sets and the set assessed as the best is actually selected. At least one of the following individual criteria is included in the assessment function:

How many further production objects of the production object sequence are before a production object of the set selected on a trial basis and themselves do not belong to the set? In order that the selected N production objects are brought forward to the first N places in the case of an actual selection, these further production objects must be buffer-stored, for example in a sorting buffer, or selected production objects must be brought past the other production objects. The fewer further production objects are determined, the higher the respective set is assessed. With regard to this individual criterion, the first N production objects of the production object sequence are optimal—but it is possible that N orders matching them are given a low individual assessment.

How many further orders of the copy of the order sequence are before an order of the set selected on a trial basis and themselves do not belong to the set? In order that, in the case of an actual selection, the selected orders can be executed, these further orders must be accepted in the electronic buffer memory.

How long, i.e. how many cycles, have the orders of the set already been in the electronic buffer memory? Orders of the set that are currently not in the buffer memory but in the order sequence are preferably given a waiting time of 0 cycles in this assessment.

What costs and what time expenditure are caused by the processing of the N production objects in the partial process according to the N orders? Taken into account here in particular are rechucking or resetting times, for example resetting times on a paint line, to allow production objects to be painted in a different color.

Preferably, in particular in the case of cyclical production, the additional position range of the partial process is determined. The position range is made up of the maximum promotion and the maximum demotion. The promotion of a production object is the number of cycles that the production object leaves the partial process earlier than planned. Correspondingly, the demotion of a production object is the number of cycles that the production object leaves the partial process later than planned. Promotions and demotions can be determined in a simple way by comparison of the order sequence with the generated copy of the order sequence. If an order in the copy leads the corresponding order in the original sequence by N cycles, the production object selected for this order in the copy also leads the order in the original sequence by N cycles.

Furthermore, the position quality in the partial process is preferably determined. The position quality is preferably calculated as the proportion of all the orders in the order sequence made up by those orders that were not deferred before feeding to the partial process. In order to determine the position quality, it is determined which orders of the copy end up in the electronic buffer memory and which do not. If, for example, the position quality is lower than a prescribed lower limit, measures are taken to increase the position quality. For example, additional places are provided in a sorting buffer for production objects, in order that more production objects can be buffer-stored and therefore a matching production object can be brought forward to the first place of the production object sequence more frequently for the first order of the copy of the order sequence by production objects being stored in the sorting buffer.

A production process, for example for motor vehicles, comprises a number of partial processes, before which selection processes are carried out. A refinement provides that, for each of these partial processes, an own copy of the order sequence is generated, used exclusively for selection processes of this one partial process. According to another refinement on the other hand, a copy is used for two partial processes, to be specific the partial process of the method as the first partial process and a further subsequent partial process as the second partial process. The first partial process is, for example, the shell construction of a production process for motor vehicles, the second the painting. The sequence of the orders in the copy is changed according to the sequence in which the orders are selected before entering the partial process. Here, the respectively selected order is inserted into the copy at the first place. The copy is used again for selection processes for the second partial process. The selection processes for the second partial process are carried out in the same way as for the first partial process.

It is possible to prescribe a different waiting time limit for the first partial process than for the second partial process.

As already explained above, suppliers for a further partial process according to the order sequence are instructed to produce and supply order-specific subsystems, which are used in the second partial process for the processing of the production objects. The further partial process is, for example, the activity of providing interior fittings, in which various subsystems, for example the cockpit and cable harnesses, are fitted into the painted vehicle bodies. The cockpit and cable harnesses are produced order-specifically according to the order sequence.

Another still further refinement provides that the production objects run one after the other through two partial processes. In order to select orders and production objects for the temporally first of these partial processes, a copy of the order sequence is generated, and orders are selected from this copy. The selection processes for the second partial process, on the other hand, are carried out with the (original) order sequence. In particular in the example just described, order-specific subsystems are manufactured, so that, in the partial process of the "activity of providing interior fittings" as the second partial process, an order usually only matches a single production object and/or a set of order-specific subsystems. A copy therefore need not be created.

Another refinement demonstrates a further value to determine automatically a code number of the partial process, to be specific the sequence quality. Preferably, whenever the sequence quality is greater than a prescribed upper limit or less than a prescribed lower limit, measures are taken. In another refinement, the sequence quality is, for example the greatest value of all the relative positions, the smallest value of all the relative positions and/or the mean value of all the relative positions.

In another refinement a test as to whether or not an order and a production object match one another is designated. Each order comprises features of the product to be produced order-specifically. Each production object comprises features that are produced in the partial process. In the case of motor vehicles, examples of these features are, for example, the designations of right-hand drive/left-hand drive or sedan/coupe or the presence or absence of possible special items of equipment. In the check whether a production object and an order match one another, the production object features are compared with a subset of the product features. Preferably, this subset exclusively comprises product features that are already produced in the partial process—only these need be used for a test. Features that are only produced in later partial processes are not taken into account in tests for the partial process. If, for example, a selection is to be carried out for the partial process of "shell construction", features that relate to the color or the interior equipment of a motor vehicle to be produced generally need not be included in the test.

In another embodiment, the bringing forward of the selected production object to the first place of the production object sequence is carried out with the aid of a sorting buffer. This embodiment is advantageous whenever the configuration of the production process and/or the premises available in a production facility do not allow a production object of the sequence to go ahead of a prior production object. If the sorting buffer does not offer sufficient free places for bringing the selected production object forward, the selection of production object and order is reversed. For this order, it is not possible to rule out the possibility of the waiting time exceeding the prescribed limit.

BRIEF DESCRIPTION OF THE DRAWINGS

An exemplary embodiment of the invention is described in more detail below on the basis of the accompanying drawings, in which.

DETAILED DESCRIPTION

Figure 1:
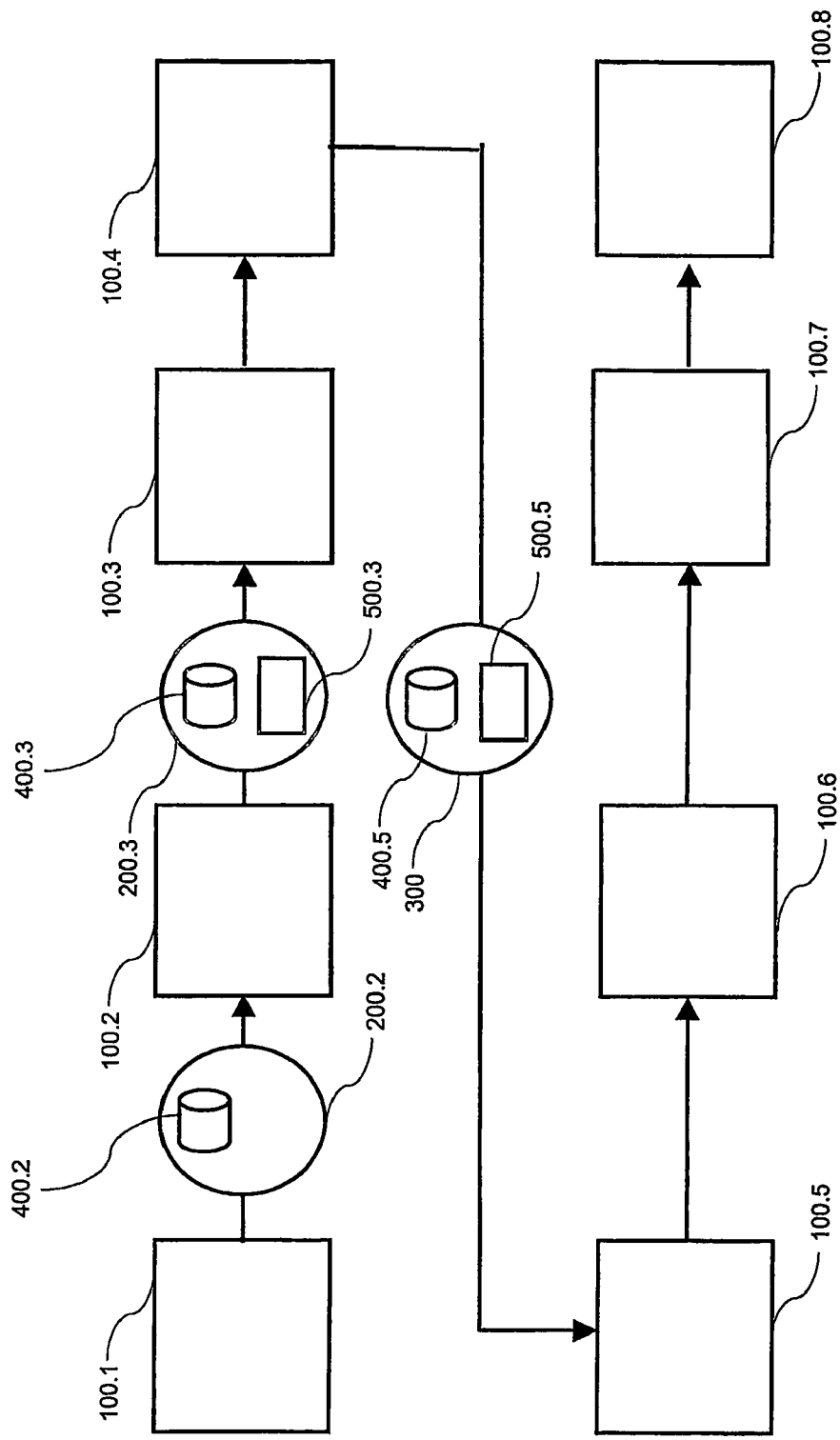
FIG. 1 shows the sequence of eight activities of a production process for the manufacture of motor vehicles.

The exemplary embodiment relates to a production process for the manufacture of motor vehicles. This production process comprises the following ten activities, which a production object runs through one after the other, in order that a motor vehicle is manufactured from it:

vehicle scheduling, lead logistics 100.1: the required lead for production, for example to inform or instruct suppliers, shell construction 100.2, surface 100.3, in particular painting, production logistics 100.4, by which, in particular, times for transporting operations within the production facility, different working times of the "activities"

and compilation of the products in the sequence in which subsequent partial processes require them are taken into account, provision of interior fittings 100.5 as a partial process combining all the assembly operations in the interior of the car, for example cockpit, seats, trim, chassis 100.6 as a partial process combining all the assembly operations from below, for example engine, drive train, axles, wheels, cables, running-in 100.7, including settings for example for lights, brakes, chassis, completing the car 100.8, including required finishing work, and final acceptance.

Vehicle scheduling and final acceptance do not require any run-through times, so they are not taken into account below. In which sequence the production objects run through the other eight activities of the production process is shown by FIG. 1.

Each activity comprises one or more partial processes. The partial processes are delimited from one another in such a way that no partial processes are performed in parallel or alternatively. Rather, the partial processes are defined such that branches only occur within a partial process. For example, the partial process 100.3 ("surface") comprises the two working steps 110.1 ("primer application") and 110.2 ("topcoat application"). In working step 100.1, for example, cathodic dip coating of the production objects completed from the shell construction is carried out and subsequently a primer ("filler") is applied. Subsequently, in working step 110.2, the topcoat is applied, determining the color of the motor vehicle, followed by adding a varnish. The topcoat is selected according to the prescribed color, and the primer is selected according to the topcoat.

According to the invention, a sequence 70 of production objects 20.1, 20.2, . . . runs through this production process from beginning to end. At the beginning, the production object only exists "on paper"; at the end of the production process, a finished motor vehicle has been created. Parallel to this, the sequence 50 of orders 10.1, 10.2 . . . runs through the same production process. In this example, each order relates to one motor vehicle. This motor vehicle is produced order-specifically, that is to say such that it meets the customer's requirements specified in the order. Typically, the production object begins running through the production process only when the order has been obtained. Preferably, each motor vehicle is produced on the basis of one order. Each order relates to a motor vehicle that can be constructed, and the execution of each order is at least begun after accepting the order. Consequently, precisely the same number of orders as the number of production objects run through the production process. At each point in time, the copy 60 of the order sequence 50 comprises precisely the same number of orders as the original order sequence 50.

Preferably, additional fictitious orders are generated, relating to an unfinished motor vehicle. Such a fictitious order is used, for example, as a basis for creating a production object that is deliberately destroyed for a test or trial during production.

The order is in an electronic form and comprises, for example, the following designations for a motor vehicle as a product to be produced order-specifically:

the model series, the body type, for example sedan or coupe, left-hand or right-hand drive, color of the paint, type of paintwork (for example metallic paint), an engine variant, four-wheel-drive or single-axle drive, closed roof or sliding roof, with or without possibility for stowing objects through the interior of the vehicle, with or without trailer coupling, desired special items of equipment for interior fitting, for example specific types of leather or fabric or an electronic navigational aid, desired special items of equipment for the chassis, including the drive train, for example fuel system, wheel rims, auxiliary electronic systems, for example window lifter or electronic braking assistant, and an agreed delivery date and, derived from it, a final date of acceptance.

From the final date of acceptance of each order, on the one hand the beginning of production for this order, on the other hand the delivery dates for the supplied subsystems are derived. These are obtained on the basis of the final date of acceptance by calculating back according to achievable run-through times through partial processes and available resources.

In the production process, a so-called launch point 300 is defined. This launch point 300 is the point at which the order sequence 50 and the production object sequence 70 are assigned to one another with binding effect. From this point, therefore, each production object of the sequence 70 is definitively assigned an order. The launch point 300 is arranged in the production process such that, on the one hand, it occurs as far as possible toward the end of the production process, on the other hand many partial processes in which diverse subsystems, often varying from order to order, are fitted into the production object only occur after the launch point. In this example, the launch point is placed directly before the provision of interior fittings. At the launch point, if need be, the original order sequence is changed, if the first production object and the first order do not match one another. In previous selection points, by contrast, only a copy of the order sequence is changed.

The suppliers supplying subsystems that are fitted in partial processes after the launch point 300 are instructed on the basis of the order sequence 50. A supplier may be an external supplier, that is to say a legally independent company, or an internal supplier, that is to say a division of the motor vehicle manufacturer. The production control according to the invention does not distinguish between internal and external suppliers. Some subsystems are required for the production of order-specific items, without being fitted into a production object, for example dies for cylinder heads.

From each order of the order sequence 50, orders for suppliers are derived with the aid of a parts list of the motor vehicle. It is possible that a number of copies of the subsystem are to be produced for a motor vehicle, for example four seats per motor vehicle. This produces a supply order sequence for each supplier.

The launch point 300 is arranged as far back in the production process as possible. This gives the suppliers a lead time that is as long as possible, to be specific the time between when the production object enters the first partial process 100.1 of the production process and when it reaches the launch point 300. With preference, the launch point 300 is placed before the partial process 100.5 ("activity of providing interior fittings"). The subsystems manufactured for the provision of interior fittings, for example cable harnesses, cockpit and seats, are so order-specific in their entirety that they can generally only be used for a single production object.

Before this launch point, an order is only assigned to a production object temporarily, for example in each case for the subsequent partial process, and an order may be assigned to one production object in one partial process and to another production object in a subsequent partial process.

In each case, a selection point is located before the following partial processes:
the selection point 200.2 before the partial process 100.2 (activity of shell construction),
the selection point 200.3 before the partial process 100.3 (activity of treating the surface) and
the launch point 300 as a selection point before the partial process 100.5 (activity of providing interior fittings).

In the two selection points 200.2 and 200.3, a production object of the production object sequence 70 and an order of the copy 60 of the order sequence are repeatedly selected. In the launch point 300, a production object of the production object sequence and an order of the order sequence 50 are selected. In all three selection points, the production object and order are selected such that they match one another. The selected production object is processed according to the selected order in the respectively subsequent partial process. For this, the selected production object is brought forward to the first place of the production object sequence 70. The production process comprises the technical means required for this, in order to realize this bringing forward. For example, the production objects that are located before the selected production object in the production object sequence are stored in a buffer memory. Such a buffer memory is known, for example, from DE 19815619 A1. Or they are moved into a yard. Or the selected production object is moved out of the production process and goes ahead of all the production objects of the production object sequence 70 before it.

In each selection point, a production object and an order that match one another are selected. Preferably, each of the partial processes with a preceding selection point is assigned in each case a selection subset of such features that have been manufactured in previous partial processes. A production object and an order are assessed as matching one another whenever every product feature of the order that belongs to the selection subset is consistent with all the features of the production object.

Preferably, each selection subset comprises as a feature the completion date required by the partial process, that is to say the date on which, at the latest, the production object matching the order must be processed in the partial process according to the order and have left the partial process.

Furthermore, each partial process is assigned a processing subset. With the aid of the features of a selected order and the features of the processing subset, a processing order for the partial process is derived. The production object is derived in the partial process according to the processing order.

For example, the partial process 100.2 (activity of shell construction) is assigned a selection subset with the following features:
model series,
body type.

The processing subset of the partial process 100.2 comprises, for example, the following features:
model series,
body type,
left-hand or right-hand drive,
closed roof or sliding roof,
with or without trailer coupling.

Features which do not play a role in the partial process 100.2 but only in the subsequent partial processes are not contained in the selection subset or in the processing subset of the partial process 100.2, for example the color and type of paintwork or the engine variant.

In the selection point 200.2, a production object of a specific model series and a specific body type is selected for the partial process 100.2. The manufacture of a production object of this model series and this body type with the features "left-hand drive" and "sliding roof" is derived as the processing order.

The selection subset of the partial process 100.3 (activity of treating the surface) comprises, for example, the following features:
model series,
body type,
left-hand or right-hand drive,
closed roof or sliding roof,
with or without trailer coupling.

The processing subset of the partial process 100.3 comprises, for example, the following features:
model series,
body type,
color of the primer,
color of the topcoat,
type of topcoat.

In the selection point 200.3, for example, a production object of a specific model series and a specific body type with the features "left-hand drive" and "sliding roof" is selected for the partial process 100.5 and a planned final date of acceptance. The painting of this production object in a specific color and type of paintwork is derived as the processing order for the partial process 100.5.

The selection subset of the partial process 100.5 (activity of providing interior fittings) comprises, for example, the following features:
model series,
body type,
left-hand or right-hand drive,
closed roof or sliding roof,
color of the primer,
color of the topcoat,
type of topcoat.

The processing subset of the partial process 100.5 (activity of providing interior fittings) comprises, for example, the following features:
model series,
body type,
left-hand or right-hand drive,
closed roof or sliding roof,
with or without possibility of stowing objects through the interior of the vehicle,
with or without trailer coupling,
desired special items of equipment for interior fitting.

A processing subset is also prescribed for the partial process 100.6 (activity of chassis assembly). A selection subset is not required, because an order is definitively assigned to a production object in the launch point 300.

With preference, the motor vehicles are manufactured in the production process in cyclical production. A planned cycle time T is prescribed for the complete production process. Two successive production objects of the production object sequence 70 are fed to a partial process in the time interval T.

The selection points 200.2, 200.3 and 300 are respectively assigned an initially empty electronic buffer memory 400.2, 400.3, 400.5 for orders. Altogether, the production process therefore comprises three buffer memories 400.2, 400.3 and 400.5. The production process also comprises a sorting buffer 500.3, in which production objects can be buffer-stored after leaving the partial process 100.2 (activity of shell construction) and before entering the partial process 100.3 (activity of treating the surface). The sorting buffer 500.3 permits random access to the production objects buffer-stored in it, i.e. at each selection point in time each production object can be removed again from the sorting buffer. A corresponding sorting buffer 500.5 is provided between the partial processes 100.3 and 100.5 (activity of providing interior fittings).

The implementation of the selection processes according to the invention in the selection point 200.3, after the partial process 100.2 (activity of shell construction) and before the partial process 100.3 (activity of treating the surface), is described below by way of example.

A total planned processing time and a maximum total run-through time for the complete production process are prescribed by the production process. A production object runs through the production process in the total planned processing time whenever it is processed without any waiting time before the production process and without any delay in the production process. The maximum total run-through time is derived as a compromise between the following two requirements:

The greatest possible degree of adherence to deadlines is to be achieved. An order is referred to as executed on time if the specified product was completed on the final date of acceptance or earlier. This is because products delivered too late can lead to contractual penalties.

The average storage time period for products completed before the final date of acceptance is to be as small as possible. This is because stockkeeping ties up capital, requires space for the products and entails the risk of damage to completed products while they are kept in stock. By contrast, products completed precisely on the final date of acceptance, or late, do not need to be kept in stock.

By dividing the total planned processing time among the individual partial processes, a planned processing time is derived for each partial process. The difference between the maximum total run-through time and the total planned processing time results in a maximum total delay time, which comprises the maximum permissible waiting times before the individual partial processes and required finishing work in individual partial processes. The total delay time for each partial process is used to derive a maximum permissible waiting time for which a production object may wait between leaving the previous partial process and entering the current partial process.

Preferably, a planned processing time and a maximum run-through time are consequently designated for each activity and each partial process. A production object runs through a partial process in the planned processing time whenever it is processed without any waiting time before the partial process and without any delay in the partial process and no finishing work, for example because of quality deficiencies, is required. The partial process is organized such that each production object requires, at the longest, the maximum run-through time for running through the partial process.

The orders 10.1, 10.2, 10.3, . . . from customers for vehicles of a specific model series are arranged in an order sequence 50. On the basis of this order sequence 50, the production of production objects is begun for products of this model series. These production objects leave the partial process 100.2 (activity of shell construction) one after the other in the production object sequence 20.1, 20.2, 20.3, . . . . A copy 60 of this order sequence 50 with the order copies 10.1, 10.2, 10.3, . . . is generated.

The value 3*T, that is to say three cycle times, is prescribed for example as the waiting time limit VS for the electronic buffer memory 400.3. Consequently, the limit amounts to 3 selection processes.

The implementation of selection processes is described in detail below. FIG. 2 to FIG. 6 show snapshots of the sequences 50, 60 and 70 and of the contents of buffer memory 400.3 and sorting memory 500.3 after the first, second, fourth, seventh and ninth selection processes. The production object selected last in each case and the selected order are joined by a double-headed arrow. A selected order and a selected production object that match one another are identified by identical hatching. The waiting time of an order, measured in cycles, is identified by a number in a circle.

The selection processes in the selection point 200.3 for the current model series begin at a point in time $T\_0$ and take place at points in time $T\_i = T_0 + i*T$ (I=0, 1, 2, 3, . . . ). The time required for the implementation of a selection process is small in comparison with the cycle time T.

At the point in time $T\_0$, the order 10.1 of the copy 60 of the order sequence 50 and the production object 20.1, which match one another, are selected. The production object 20.1 is fed to the partial process 100.3 and is processed in the latter according to the selected order 10.1. The selected order 10.1 has a relative position of 0 in the selection sequence in comparison with the order sequence 50.

Figure 2:
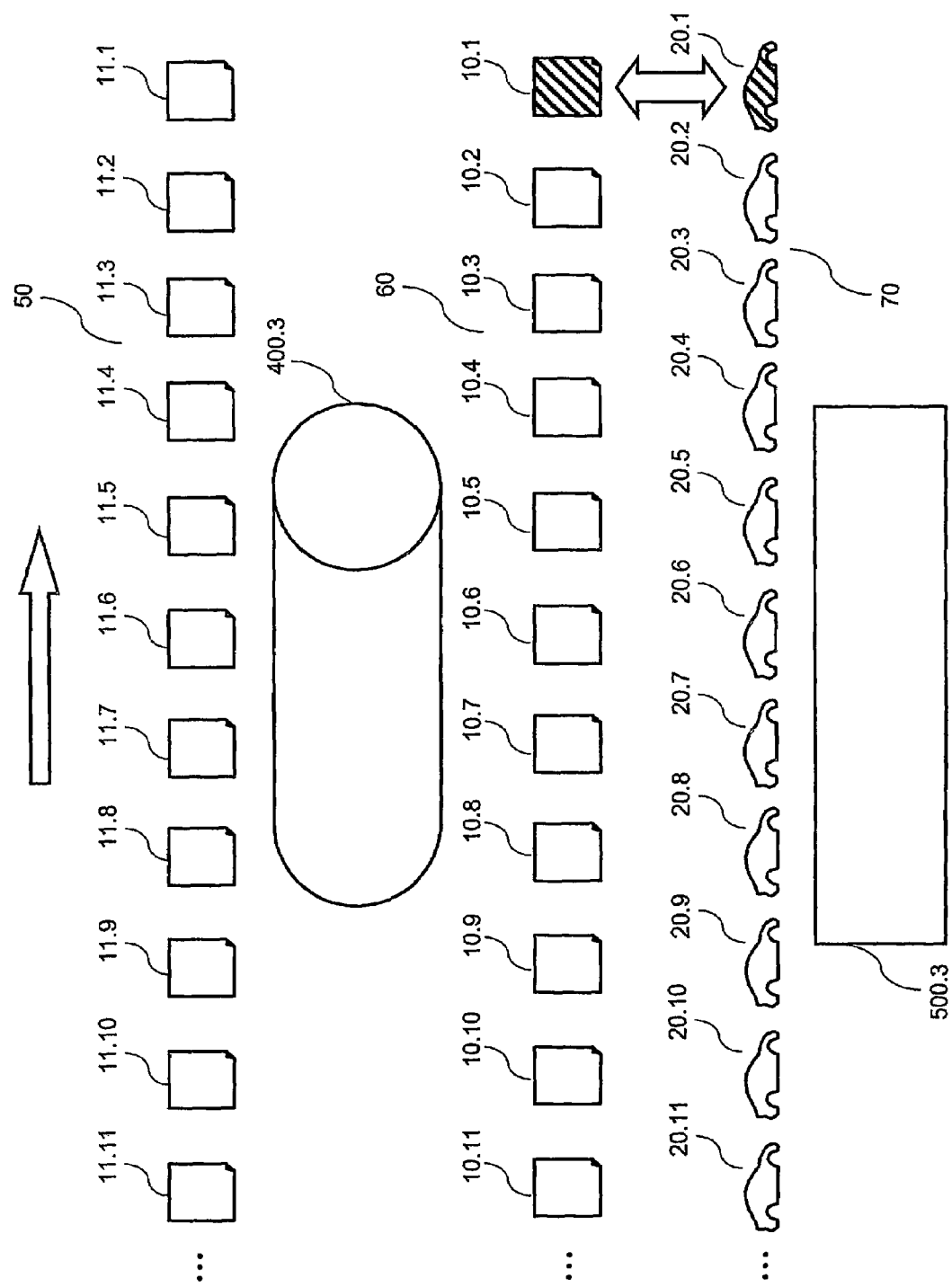
FIG. 2 shows the production objects and orders in the exemplary embodiment after the first selection process.

FIG. 2 shows a snapshot of the production objects and orders after implementation of this first selection process. The orders and production objects are represented as coming from the left. The selected order 10.1 and the selected production object 20.1 are shown hatched and are joined by a double-headed arrow. The electronic buffer memory 400.3 and the sorting memory 500.3 for production objects are still empty.

Figure 3:
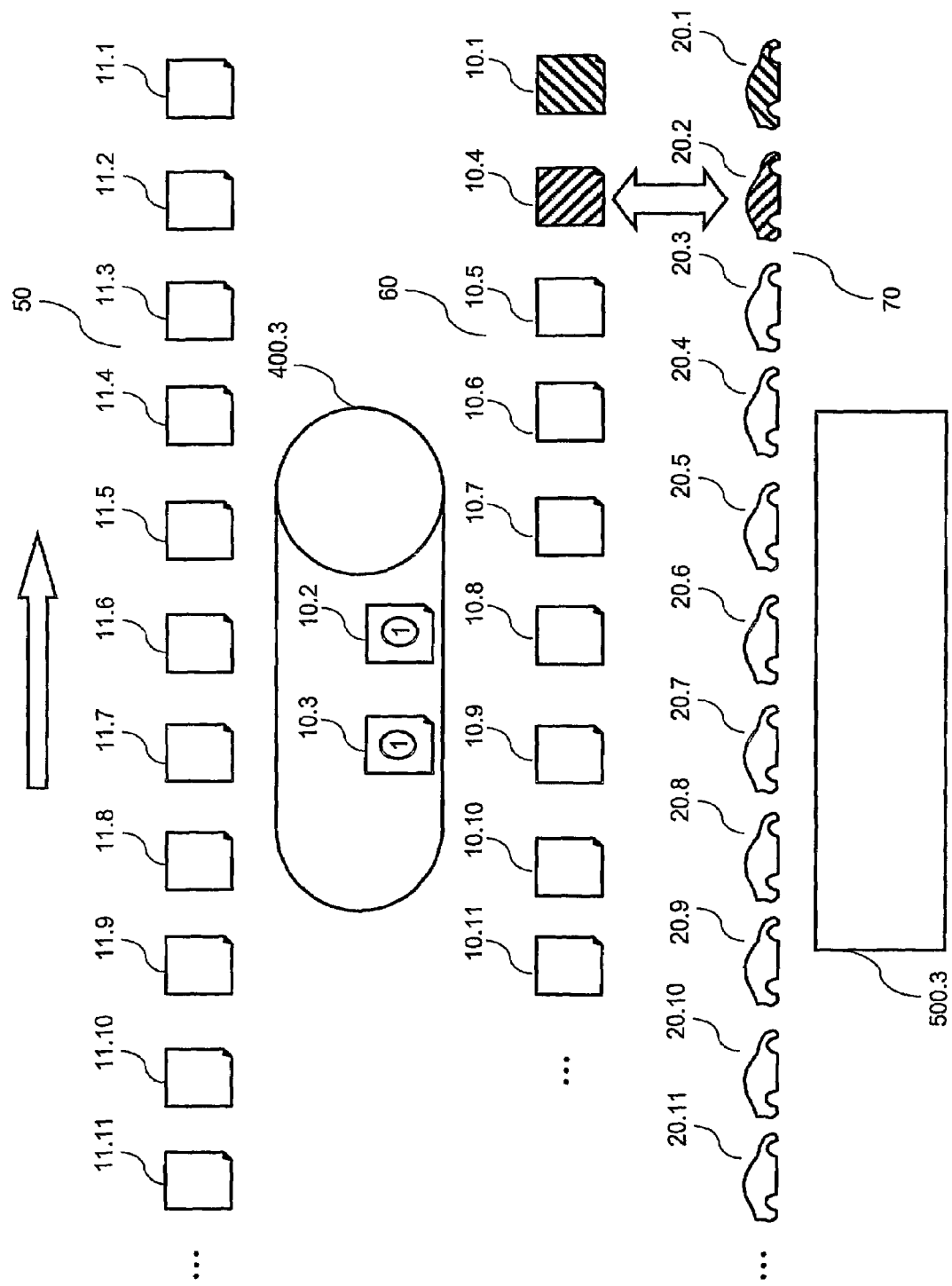
FIG. 3 shows the production objects and orders in the exemplary embodiment after the second selection process.

At the point in time T_1=T_0+T, it is established that the order 10.2 and the production object 20.2 do not match one another, because the order 10.2 relates to a left-hand drive vehicle, whereas the production object 20.2 relates to a right-hand drive vehicle. The order 10.2 is stored in the buffer memory 400.3. The order 10.3 also does not match the production object 20.2, because the order 10.3 relates to a motor vehicle with a closed roof, whereas the production object 20.3 is one with a sliding roof. Therefore, the order 10.3 is also stored in the buffer memory 400.3. The order 10.4 and the production object 20.2 match one another and are therefore selected. The production object 20.2 is fed to the partial process 100.3 and processed in the latter according to the selected order 10.4. After the point in time T_1, the two orders 10.2 and 10.3 are in the buffer memory 400.3 with a waiting time V of 0 (selection processes) in each case. The selected order 10.4 has a relative position of +2, because it was selected 2 selection processes earlier than corresponding to the order sequence 50. FIG. 3 shows a snapshot of the order sequence 50 and its copy 60, the production object sequence 70, the buffer memory 400.3 and the sorting buffer 500.3 after implementation of the second selection process.

At the point in time T_2=T_0+2*T, it is established that neither the order 10.2 nor the order 10.3 match the production object 20.3, which is now the first production object of the production object sequence 70. Therefore, the first order of the copy 60 of the order sequence, to be specific the order 10.5, and the production object 20.3, which match one another, are selected. The production object 20.3 is fed to the partial process 100.3 and processed in the latter according to the selected order 10.5. After the point in time T_2, the two orders 10.2 and 10.3 are in the buffer memory 400.3 with a waiting time V of 1 (selection processes) in each case. The selected order 10.5 has a relative position of +2.

Also at the point in time T_3=T_0+3*T, firstly the orders in the buffer memory 400.3 are compared with the first production object 20.4. Both orders match the production object 20.4. Because the order 10.2 has the earlier final date of acceptance, it is selected together with the production object 20.4. The order 10.2 is removed from the buffer memory 400.3. The production object 20.4 is fed to the partial process 100.3 and processed in the latter according to the selected order 10.2. After the point in time T_3, the order 10.3 is in the buffer memory 400.3 with a waiting time V of 2 (selection processes). The selected order 10.2 has a relative position of −2, because it was selected 2 selection processes later than corresponding the order sequence 50.

At the point in time T_4=T_0+4*T, firstly the order 10.3 is compared with the production object 20.5. However, the order 10.3 and the production object 20.5 do not match one another. The next order 10.6 of the copy 60 of the order sequence and the production object 20.5 also do not match one another. Therefore, the order 10.6 is stored in the buffer memory 400.3. The production object 20.5 and the then following order 10.7 of the copy 60 match one another. Therefore, these two are selected. The production object 20.5 is fed to the partial process 100.3 and processed in the latter according to the selected order 10.7. After the point in time T_4, the order 10.3 is in the buffer memory 400.3 with a waiting time V of 3 and the order 10.6 is in it with a waiting time of 0 (selection processes). The selected order 10.7 has a relative position of +2.

Figure 4:
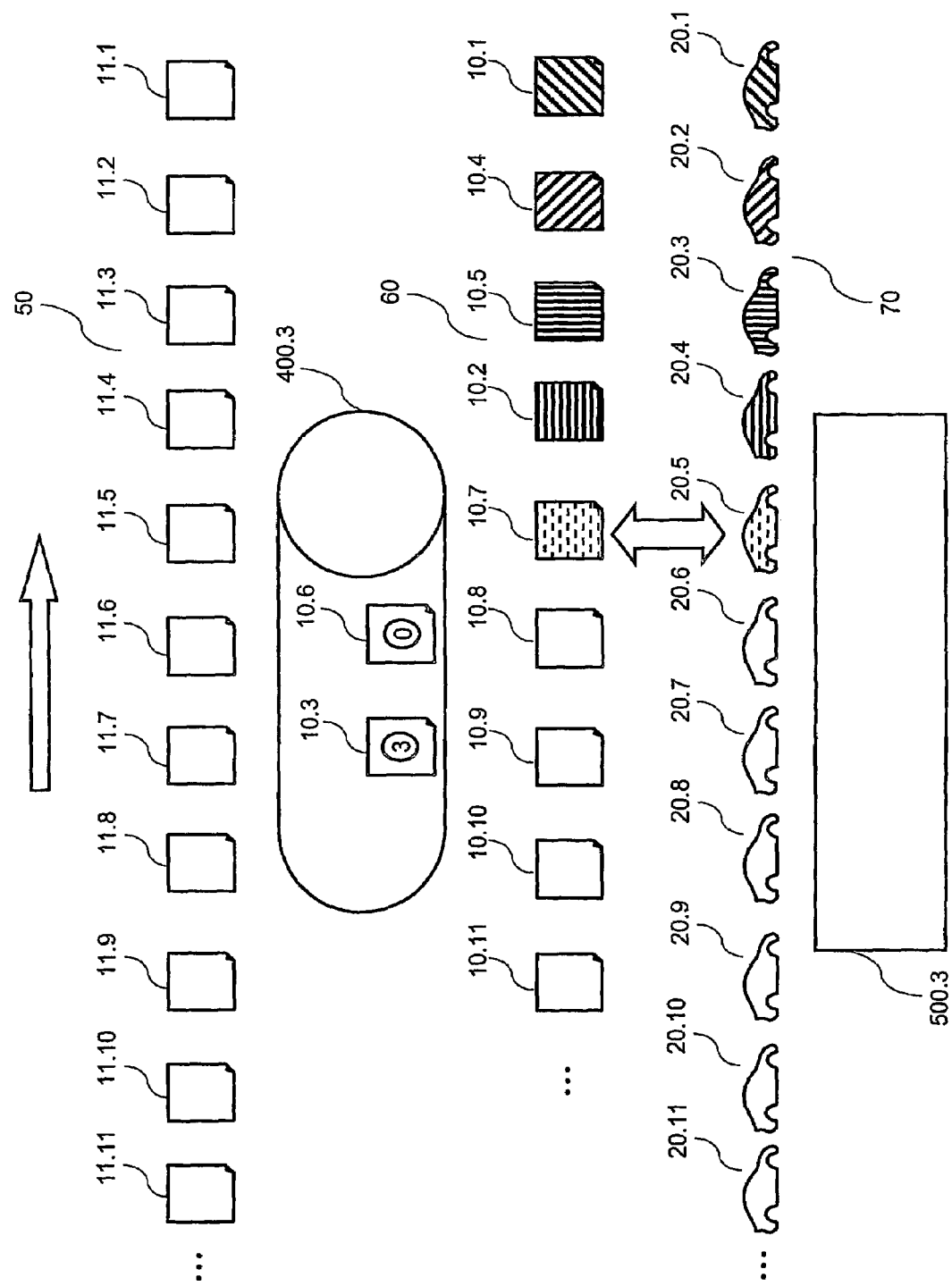
FIG. 4 shows the production objects and orders in the exemplary embodiment after the fifth selection process.

FIG. 4 shows a snapshot of the production objects and orders in the exemplary embodiment after the fifth selection process.

At the point in time T_5=T_0+5*T, the waiting time of the order 10.3 in the buffer memory 400.3 is greater than the prescribed waiting time limit VS=3 (selection processes), to be specific already 4 selection processes. Therefore, the order 10.3 is selected and removed from the buffer memory 400.3. It is established that the production object 20.8 matches the order 10.3, but the production objects 20.6 and 20.7 before it do not. The production objects 20.6 and 20.7 are therefore stored in the sorting buffer 500.3. The production object 20.8 is selected, fed to the partial process 100.3 and processed in the latter according to the selected order 10.3. After the point in time T_5, the order 10.6 is in the buffer memory 400.3 with a waiting time V of 1 (selection processes). The selected order 10.3 has a relative position of −3.

At the point in time T_6=T_0+6*T, firstly the order 10.6 in the buffer memory 400.3 is compared with the two production objects 20.6 and 20.7 in the sorting buffer 500.3. However, the order 10.6 does not match either of these two production objects. In a preferred embodiment, the next order 10.8 of the copy 60 of the order sequence is subsequently compared with the two production objects 20.6 and 20.7 in the sorting buffer 500.3. As an alternative to this, it is also possible to compare the next production object 20.8 of the production object sequence 70 with the order 10.6 in the buffer memory 400.3. However, the preferred embodiment is chosen because it is more complicated to store and remove production objects in and from the sorting buffer than orders in and from an electronic buffer memory.

In the present example, the order 10.8 and the production object 20.6 match one another. Both are selected at the point in time T_6. The production object 20.6 is removed from the sorting buffer, fed to the partial process 100.3 and processed in the latter according to the selected order 10.8. After the point in time T_6, the order 10.6 is in the buffer memory 400.3 with a waiting time V of 2 (selection processes). In the sorting buffer 500.3 there is still the production object 20.7. The selected order 10.8 has a relative position of +1.

At the point in time T_7=T_0+7*T, firstly the order 10.6 in the buffer memory 400.3 is compared with the production object 20.7 in the sorting buffer 500.3, but these two do not match one another. The next order 10.9 likewise does not match the production object 20.7 in the sorting buffer 500.3 and also does not match the next production object 20.9 of the production object sequence 70. Therefore, the order 10.9 is stored in the buffer memory 400.3. The then following order 10.10 and the production object 20.9 match one another and are selected. The production object 20.9 is fed to the partial process 100.3 and processed in the latter according to the selected order 10.9. In the sorting buffer 500.3 there is still the production object 20.7. After the point in time T_7, the order 10.6 is in the buffer memory 400.3 with a waiting time V of 3 and the order 10.9 is in it with a waiting time V of 0 (selection processes). The selected order 10.10 has a relative position of +2.

Figure 5:
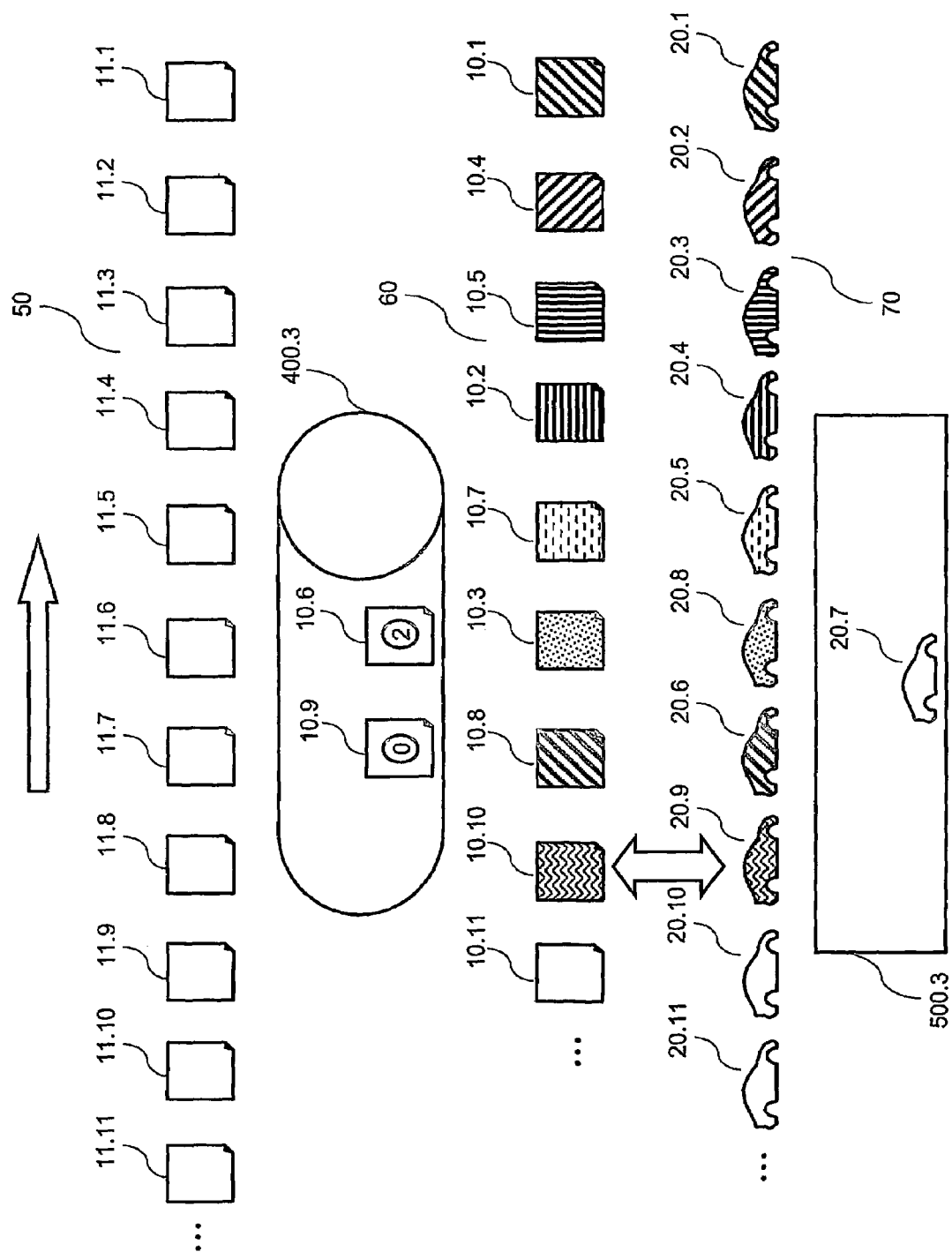
FIG. 5 shows the production objects and orders in the exemplary embodiment after the eighth selection process.

FIG. 5 shows a snapshot of the production objects and orders in the exemplary embodiment after the eighth selection process.

At the point in time T_8=T_0+8*T, firstly the order 10.6 in the buffer memory 400.3 is compared with the production object 20.7 in the sorting buffer, but these two do not match one another. The other order in the buffer memory 400.3, that is 10.9, and the production object 20.7 also do not match one another. The next order 10.11 of the copy 60 of the order sequence 50 and the production object 20.7 likewise do not match one another. The order 10.11 is stored in the buffer memory 400.3. On the other hand, the then following order 10.12 and the next production object 20.10 of the production object sequence 70 match one another and are selected. After the point in time T_8, that is to say after the eighth selection process, the orders 10.6, 10.9 and 10.11 are in the buffer memory 400.3 with a waiting time V of 3 and the order 10.9 is in it with a waiting time V of 3, 1 or 0 (selection processes). The selected order 10.12 has a relative position of +3.

At the point in time T_9=T_0+9*T, the waiting time of the order 10.6 is above the waiting time limit. Therefore, this order is selected. The next production object that matches the order 10.6 is the production object 20.14. To be able to bring this matching production object forward to the first place, the production objects 20.11, 20.12 and 20.13 before it must be stored in the sorting buffer. In this example, on the other hand, the sorting buffer only has three available places for production objects, and, apart from storage in the sorting buffer 500.3, there is no possibility of bringing the production object forward after it leaves the partial process 100.2.

One of the following method steps is performed to continue:

A procedure is used to bring the production object 20.14 forward and feed it to the partial process 100.3 without using the sorting buffer 500.3. For example, the production object 20.14 is moved out of the production object sequence 70 and brought forward with the aid of a manned transporting device and fed to the partial process 100.3. However, this procedure often cannot be carried out or is complicated and is therefore rarely used.

The order 10.6 and a production object which can be brought forward to the first place with the aid of the sorting buffer 500.3 are selected, although the selected order 10.6 and the selected production object do not match. This alternative is only carried out if the selected production object can subsequently be made to match the selected order. This is the case in particular whenever the production object only does not match the order because a subsystem for the production object is supplied too late and, instead of being fitted in the partial process 100.2, is fitted in the subsequent partial process 100.3.

The selection of the order 10.6 is reversed, and the order 10.6 is marked as not able to be fed to the partial process 100.3 within the maximum permissible waiting time. The order 10.6 is returned to vehicle scheduling (partial process 100.1). There it is rescheduled.

In the example described here, the third alternative is realized, because the first two cannot be technically realized for the partial process 100.3. Preferably, it is first checked whether its production is possible in principle or is not possible at present, for example because of a failure. If, for example, the order 10.6 envisages four-wheel drive and the production or supply of four-wheel drives is completely out of action at the time, the order 10.6 is not scheduled until the production of four-wheel drives is reinstated.

On the other hand, the order 10.9 and the first production object 20.11 match one another and are selected. After the point in time T_9, the orders 10.6 and 10.11 are in the buffer memory 400.3 with a waiting time V of 4 and 1, (selection processes) respectively. The selected order 10.12 has a relative position of −1. Up until the rescheduling of the order 10.6, the production object sequence 70 comprises one production object more than the order sequence 10 has orders.

Figure 6:
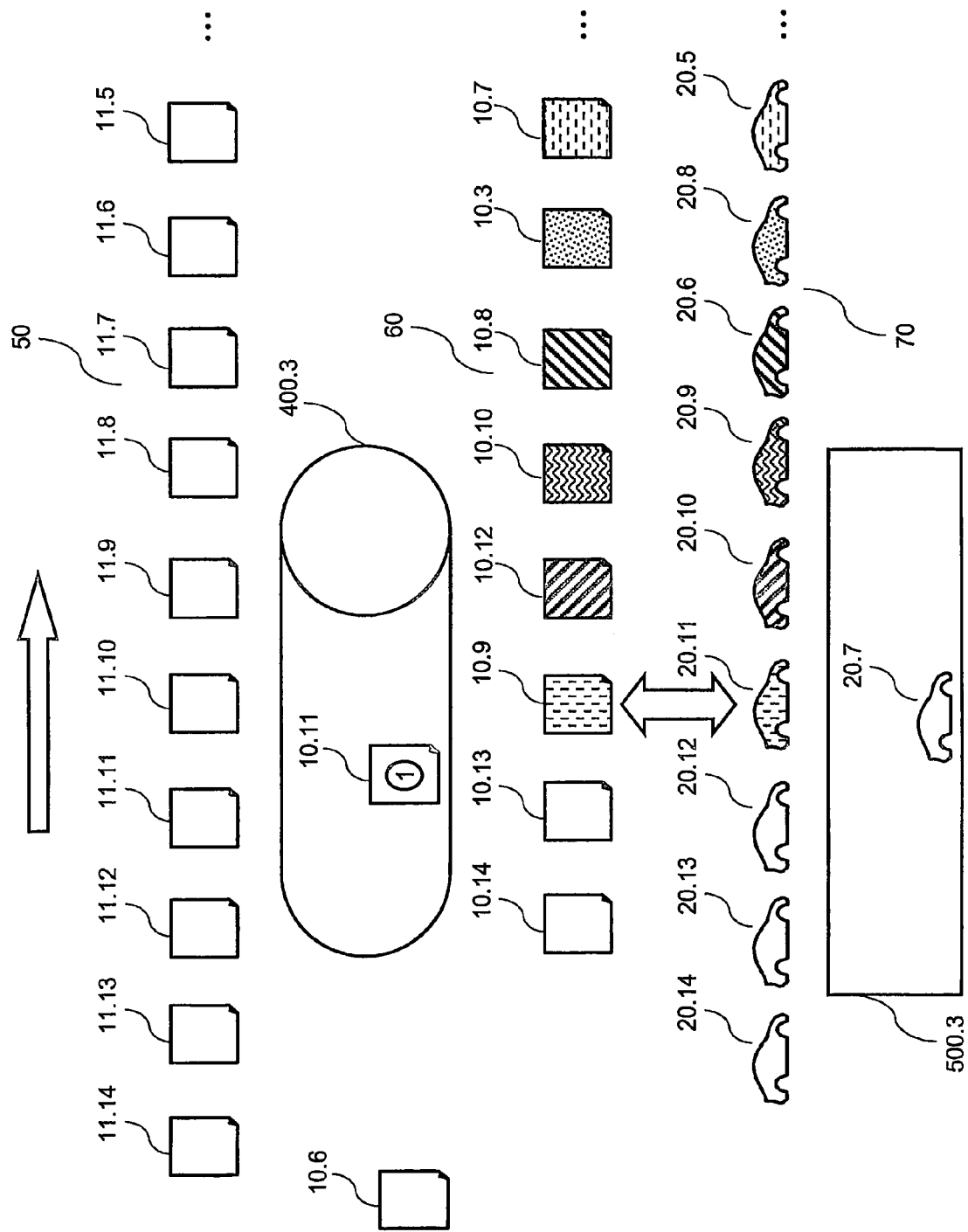
FIG. 6 shows the production objects and orders in the exemplary embodiment after the tenth selection process.

FIG. 6 shows a snapshot of the production objects and orders in the exemplary embodiment after the tenth selection process. The four orders and production objects selected first are no longer represented in FIG. 6, but, in place of them, the remaining production objects and orders not represented in the previous figures.

The selection of a production object and an order in each case is continued until the entire order sequence has been processed.

The following table illustrates the sequence of the selection processes. Entered in it are the figures showing the situation respectively reached, where:

Pnt in time gives the number i of the point in time of selection T_i,

1st order is the first order in the copy 60 of the order sequence 50 before implementation of the selection process No. i, 1st PO is the first production object in the production object sequence 70 before implementation of the selection process No. i, Content of buffer memory is the content of the electronic buffer memory 400.3 after implementation of the selection process No. i, the respective times been indicated in square parentheses, Content of sorting buffer is the content of the sorting buffer 500.3 after implementation of the selection process No. i, Select order is the order selected from the copy in the selection process No. i, Select. PO is the production object selected from the production object sequence 70 in the selection process No. i, Rel. pos. is the relative position of the selected order.

| Pnt in time | 1st order | 1st PO | Content of buffer memory | Content of sorting buffer | Select. order | Select. PO | Rel. pos. |
|---|---|---|---|---|---|---|---|
| | | | FIG. 2 | | | | |
| 0 | 10.1 | 20.1 | ./. | ./. | 10.1 | 20.1 | 0 |
| | | | | FIG. 3 | | | |
| 1 | 10.2 | 20.2 | 10.2 [0], 10.3 [0] | ./. | 10.4 | 20.2 | +2 |
| | | | | FIG. 4 | | | |
| 2 | 10.5 | 20.3 | 10.2 [1], 10.3 [1] | ./. | 10.5 | 20.3 | +2 |

-continued

| Pnt in time | 1st order | 1st PO | Content of buffer memory | Content of sorting buffer | Select. order | Select. PO | Rel. pos. |
|---|---|---|---|---|---|---|---|
| 3 | 10.6 | 20.4 | 10.3 [2] | ./. | 10.2 | 20.4 | −2 |
| 4 | 10.6 | 20.5 | 10.3 [3], 10.6 [0] | ./. | 10.7 | 20.5 | +2 |

FIG. 5

| 5 | 10.8 | 20.6 | 10.6 [1] | 20.6, 20.7 | 10.3 | 20.8 | −3 |
| 6 | 10.8 | 20.9 | 10.6 [2] | 20.7 | 10.8 | 20.6 | +1 |
| 7 | 10.9 | 20.9 | 10.6 [2], 10.9 [0] | 20.7 | 10.10 | 20.9 | +2 |

FIG. 6

| 8 | 10.11 | 20.10 | 10.6 [3], 10.9 [1], 10.11 [0] | 20.7 | 10.12 | 20.10 | +3 |
| 9 | 10.13 | 20.11 | 10.11 [1] | 20.7 | 10.9 | 20.11 | −1 |

In the preferred embodiment, the selection processes are carried out by an industry-standard production management computer. This production management computer is of a redundant design and therefore has high availability. The orders are stored as data records in a database, to which the production management computer has read and write access. A data record is created for an order as soon as the order is received. The data record remains in the database until a motor vehicle has been completed according to the order and an invoice has been issued and paid. Also stored in the database are data records for production objects.

It is possible to realize each electronic buffer memory as a database of its own and to copy data records in real time. Computing time and storage capacity are saved if no data records are copied, but instead the method is realized by creating and changing additional data fields. This is described below.

Each data record for an order comprises the following data fields:
data fields for the designations described above of the motor vehicle to be produced on the basis of the order, for example color of the paint and desired special items of equipment,
planned position, that is the position of the order in the order sequence 50,
an identification of the production object that is currently being processed on the basis of the order,
an identification of the partial process in which a production object is currently being processed according to the order,
actual position, that is the position of the order in the copy 60 of the order sequence,
an identification of the electronic buffer memory in which the order is currently located,
for each partial process, the two planned points in time at which, according to the vehicle scheduling, the processing of a production object according to the order is to be begun and ended,
for each partial process, the two actual points in time at which the processing of a production object according to the order was actually begun and ended.

A data record for a production object comprises the following data fields:
an identification of the partial process in which the production object is currently being processed,
an identification of the order on the basis of which the production object is currently being processed,
position of the production object in the production object sequence 70,
an identification of the sorting buffer in which the production object is currently located.

If an order is "waiting" before a partial process, that is to say a production object has been processed on the basis of the order in a previous partial process and the production object has left the previous partial process but not yet been selected for the next partial process, the partial process before which the order is waiting is noted. The data field for an electronic buffer memory is of course only filled when an order of the copy has been stored in the electronic buffer memory. After removal of the order from the electronic buffer memory, a data field for the buffer memory is emptied.

In the example of FIG. 4, the planned position of the order 10.1 is 1, that of the order 10.2 is 2, and so on. The actual position of the order 10.1 is 1, that of the order 10.2 is 4, that of the order 10.4 is 2, and so on. After the fourth selection process, the order 10.3 has no planned position. In the corresponding data field, an identification of the buffer memory 400.3 is noted.

In the implementation of a selection process, the production management computer searches through the data records for orders and in each case searches for a production object and an order that match one another. Once these are found, an identification of the selected production object is noted in the data record for the selected order. Conversely, an identification of the selected order is noted in the data record for the selected production object. The data fields "actual position" of the order data record and "position" of the production object are filled with the current values. The copy of the order sequence is formed by the data fields "actual position" of the order data records being filled and changed. As soon as an order has reached the "launch point" 300, the values in "actual position" and "planned position" are identical, so that only the value of "planned position" is still required.

Preferably, the data fields "actual position", "actual points in time", "electronic buffer memory" and "production object of the order data records" as well as "position" and "order" of the production object data records are regularly emptied and written with the current values. These current values are previously determined. As a result, a defined rerun point is regularly created. For example, every night preventive maintenance of the entire production process is carried out.

During this maintenance, the data fields just mentioned are emptied and filled with the current values determined.

LIST OF REFERENCES

| Number | Meaning |
|---|---|
| 10.1, 10.2, 10.3, . . . | Orders of the copy of the order sequence 60 |
| 11.1, 11.2, 11.3, . . . | Orders of the original order sequence 50 |
| 20.1, 20.2, 20.3, . . . | Production object sequence after the partial process 100.2 |
| 50 | Original order sequence |
| 60 | Copy of the order sequence |
| 70 | Production object sequence |
| 100.1, 100.2, . . . | Activities of the production process as partial processes |
| 100.1 | Activity of lead logistics |
| 100.2 | Activity of shell construction |
| 100.3 | Activity of treating the surface |
| 100.4 | Activity of production logistics |
| 100.5 | Activity of providing interior fittings |
| 100.6 | Activity of chassis assembly |
| 100.7 | Activity of running-in |
| 100.8 | Activity of completing the car |
| 110.1, 110.2 | Working steps of partial processes |
| 200.2 | Selection point before the activity of shell construction |
| 200.3 | Selection point before the activity of treating the surface |
| 300 | Launch point, selection point before the activity of providing interior fittings |
| 400.2 | Electronic buffer memory for the partial process 100.2 |
| 400.3 | Electronic buffer memory for the partial process 100.3 |
| 400.5 | Electronic buffer memory for the partial process 100.5 |
| 500.3 | Sorting buffer for production objects between the partial processes 100.2 and 100.3 |
| 500.5 | Sorting buffer for production objects between the partial processes 100.3 and 100.5 |

What is claimed is:

1. A method for automatically controlling a production process for the series production of order-specific products, the production process including a partial process, a sequence of orders in electronic form for the products produced in the production process, and a sequence of production objects running through the production process, the products being created by the production objects, a selection process selecting an order of the order sequence and a production object of the production object sequence that match one another, the selected production object being processed according to the selected order in the partial process, the selection process and processing being repeated until each order of the order sequence has run through the partial process, the method comprising:
   generating a copy of the order sequence;
   creating an initially empty electronic buffer memory for orders;
   in a selection process, whenever a first production object of the production object sequence and a first order of the copy do not match one another, removing the first order from the copy and storing the first order in the buffer memory; and
   in a further selection process, whenever a waiting time of at least one order in the buffer memory up to the selection process is greater than or equal to a prescribed waiting time limit, selecting the order with a greatest waiting time in the buffer memory and a matching production object from the production object sequence, removing the selected order from the buffer memory, and bringing forward the selected production object to a first place of the production object sequence.

2. The method as recited in claim 1 further comprising prescribing a minimal time interval between two consecutive selection processes, prescribing a numerical limit for the maximum number of orders in the buffer memory, and prescribing a value less than or equal to the product of the minimal time interval and the numerical limit as the prescribed waiting time limit.

3. The method as recited in claim 1 further comprising prescribing:
   a maximum run-through time through the partial process to be guaranteed for all production objects of the production object sequence,
   a maximum processing time, applicable to all production objects of the production object sequence, as a time interval between when the production object is selected and when the production object leaves the partial process,
   a maximum time interval between two successive selection processes, and
   prescribed waiting time limit such that the sum of the prescribed waiting time limit, the prescribed maximum time interval, and the prescribed maximum processing time is less than or equal to the prescribed maximum run-through time.

4. The method as recited in claim 1 wherein whenever the waiting time of an order in the buffer memory has reached or exceeded the waiting time limit, for each order in the buffer memory, on a trial basis:
   a matching production object is determined,
   a work order for the partial process is generated for the processing of the matching production object for the order, and
   how long the implementation of this work order will last is determined; and
   the order in the buffer memory for which a sum of the waiting time in the buffer memory and the determined implementation time on the trial basis takes the greatest value is selected.

5. The method as recited in claim 1 wherein whenever no production object in the production object sequence matches the order with the greatest waiting time and the greatest waiting time is greater than the waiting time limit, the unmatched order is removed from the buffer memory and marked.

6. The method as recited in claim 1 wherein, whenever the buffer memory contains at least one order matching the first production object of the production sequence, and no order in the buffer memory has a waiting time greater than the waiting time limit, the first production object and the matching order are selected.

7. The method as recited in claim 1 wherein a natural number N is prescribed as a batch size for processing of production objects in the partial process, N orders processable as a batch in the partial process are selected from the copy of the order sequence and/or the buffer memory, and N production objects of the production object sequence that match the N orders are selected, brought forward to the first N places of the production object sequence and processed according to the N orders in the partial process.

8. The method as recited in claim 7 wherein a set of N orders and N production objects matching the set of N orders is repeatedly selected on a trial basis, each of the selected sets is assessed with an assessment function based on at least one of the following individual criteria:
- a number of production objects of the production object sequence that are before a production object of the set selected on a trial basis and themselves do not belong to the set,
- a number of orders of the copy of the order sequence that are before an order of the set selected on a trial basis and themselves do not belong to the set,
- the maximum waiting time in the buffer memory of those of the N orders selected on a trial basis,
- costs for the processing of the N production objects in the partial process according to the N orders, and
- a time requirement for the processing of the N production objects in the partial process according to the N orders; and further comprising selecting a set assessed with the assessment function as a best set.

9. The method as recited claim 7 wherein the first N production objects of the production object sequence and N orders matching the first N production objects are selected.

10. The method as recited in claim 1 wherein the selected order is inserted into the copy at the first place, and a maximum promotion or a maximum demotion of the production objects of the production object sequence is determined, the order sequence being compared with the copy of the order sequence.

11. The method as claimed in claim 1 further comprising determining a quotient of:
- a number of the orders in the copy of the order sequence stored in the buffer memory; and
- a number of the orders in the order sequence before a first selection process.

12. The method as recited in claim 1 wherein after the partial process, the production objects run through a further partial process, the selected order is inserted into the copy at the first place, a second, initially empty, electronic buffer memory for orders is created, a second selection process, in which an order of the copy and a production object of the production object sequence that match one another are selected, is carried out for the further partial process, and whenever a first production object of the production object sequence and a first order of the copy do not match one another, the first order is removed from the copy and stored in the second buffer memory, and in a second further selection process, whenever a waiting time of at least one order in the second buffer memory up to the second selection process is greater than or equal to a prescribed further waiting time limit, the order with the greatest waiting time in the second buffer memory and a production object matching the order with the greatest waiting time from the production object sequence are selected, the selected order is removed from the second buffer memory, and the selected production object is brought forward to the first place of the production object sequence, the selected production object is processed according to the selected order in the further partial process, and the second selection process and processing are repeated until every order of the order sequence has run through the further partial process.

13. The method as claimed in claim 1 wherein the production process comprises a further partial process run through the production objects after the partial process,
- a second selection process, in which an order of the order sequence and a production object of the production object sequence that match one another are selected, is carried out for the further partial process,
- the selected production object is processed according to the selected order in the further partial process; and
- the second selection process and processing are repeated until every order of the order sequence has run through the further partial process.

14. The method as recited in claim 1 wherein positions of the orders in the order sequence are compared with the sequence in which the orders are selected, and further comprising:
- determining, for each order, a relative position in the selection sequence in comparison with a respective position in the order sequence; and
- calculating a sequence quality of the production process from the relative positions of all the orders.

15. The method as recited in claim 14 wherein the calculation of the sequence quality includes determining a greatest value of all the relative positions, a smallest value of all the relative positions, or a mean value of all the relative positions.

16. The method as recited in claim 1 wherein each order has product features of the product to be produced order-specifically, each production object having production object features which have been manufactured in a previous partial process of the production process, and, in the check whether a production object and an order match one another, the production object features are compared with a subset of the product features.

17. The method as recited in claim 16 wherein a production object and an order are assessed as matching one another whenever every product feature of the order that belongs to the selection subset is consistent with all the production object features.

18. The method as recited claim 1 wherein for each order of the order sequence, a data record is created in an electronic database, the data record including:
- a first data field for an order position of the order in the order sequence; and
- a second data field for a copy position of the order in the copy,
- the copy being formed by the second data field of each data record being filled with a respective value of a first data record;
- and, when the order is selected, the copy position of the order in the copy is entered in the second data field.

19. The method as recited in claim 18 wherein each data record includes an initially empty third data field for the electronic buffer memory, an order is stored in the buffer memory by the third data field of the data record for the order being filled with an identification of the buffer memory, and an order being removed from the buffer memory by the third data field being emptied.

20. The method as recited in claim 1 wherein the production process includes a sorting buffer, and, when the selected production object is brought forward to the first place of the production object sequence, all the production objects of the production object sequence before the selected production object are stored in the sorting buffer.

21. The method as recited in claim 20 wherein the sorting buffer includes a designated maximum number of available places for production objects, and, whenever free places are not available in the sorting buffer for every production object that is arranged in the production object sequence before the selected production object, a selection of the order and of the production object is reversed and the order is removed from the buffer memory and marked.

22. An apparatus for automatically controlling a production process as recited in claim 1, the apparatus comprising:

a device for selecting an order of the order sequence and a production object of the production object sequence that match one another;
an electronic buffer memory for the orders;
a device for generating a copy of the order sequence; and
a device for selecting an order with the greatest waiting time in the electronic buffer memory.

23. A computer program product loaded directly into an internal memory of a computer and comprising software sections performing the method as recited in claim 1 when the computer program product runs on the computer.

24. A computer program product stored on a computer-readable medium and having computer-readable programming causing a computer to perform the method as recited in claim 1.

* * * * *